United States Patent
Evanchik et al.

(10) Patent No.: US 10,013,484 B2
(45) Date of Patent: Jul. 3, 2018

(54) USER DRIVEN COMPUTERIZED SELECTION, CATEGORIZATION, AND LAYOUT OF LIVE CONTENT COMPONENTS

(75) Inventors: Stephen A. Evanchik, Malden, MA (US); Alister Lewis-Bowen, Cambridge, MA (US); Louis M. Weitzman, Brookline, MA (US)

(73) Assignee: International Business Machines Corporation, Armonk, NY (US)

( * ) Notice: Subject to any disclaimer, the term of this patent is extended or adjusted under 35 U.S.C. 154(b) by 2246 days.

(21) Appl. No.: 11/530,487

(22) Filed: Sep. 11, 2006

(65) Prior Publication Data

US 2008/0065982 A1 Mar. 13, 2008

(51) Int. Cl.
*G06F 17/30* (2006.01)
*G06F 3/0483* (2013.01)
*G06F 3/0486* (2013.01)

(52) U.S. Cl.
CPC ...... *G06F 17/30716* (2013.01); *G06F 3/0483* (2013.01); *G06F 3/0486* (2013.01)

(58) Field of Classification Search
CPC .............. G06F 17/3089; G06F 17/211; G06F 17/30899; G06F 17/30893; G06F 3/0481; G06F 3/0484; G06F 17/30014
USPC .................. 715/769, 255, 770, 272; 707/705
See application file for complete search history.

(56) References Cited

U.S. PATENT DOCUMENTS

| | | | |
|---|---|---|---|
| 5,367,621 A | 11/1994 | Cohen et al. | 395/154 |
| 5,629,846 A * | 5/1997 | Crapo | 708/705 |
| 5,983,268 A * | 11/1999 | Freivald et al. | 709/218 |
| 6,122,647 A | 9/2000 | Horowitz et al. | 707/513 |
| 6,278,448 B1 * | 8/2001 | Brown et al. | 715/866 |
| 6,538,673 B1 * | 3/2003 | Maslov | 715/853 |
| 6,738,804 B1 * | 5/2004 | Lo | 709/219 |
| 6,763,496 B1 | 7/2004 | Hennings et al. | 715/501.1 |
| 6,826,553 B1 * | 11/2004 | DaCosta et al. | |
| 6,901,403 B1 | 5/2005 | Bata et al. | 707/101 |
| 6,928,610 B2 | 8/2005 | Brintzenhofe et al. | 715/517 |
| 6,931,600 B1 * | 8/2005 | Pittman | 715/767 |
| 7,085,994 B2 * | 8/2006 | Gvily | 715/234 |
| 7,315,848 B2 * | 1/2008 | Pearse et al. | |
| 2002/0018078 A1 * | 2/2002 | Khan et al. | 345/762 |
| 2002/0062325 A1 | 5/2002 | Berger et al. | 707/518 |
| 2003/0167315 A1 * | 9/2003 | Chowdhry | G06F 17/30873 709/218 |
| 2004/0019611 A1 * | 1/2004 | Pearse et al. | 707/104.1 |

(Continued)

OTHER PUBLICATIONS

Andrew Giles-Peters, "ScrapBook 1.1 (& Add-ons): A Firefox extension for gathering information from the web", Aug. 2006, DOI: http://amb.vis.ne.jp/mozilla/scrapbook/files/ScrapbookTutorial-1.1.pdf.*

*Primary Examiner* — Kavita Padmanabhan
*Assistant Examiner* — Brian Garmon
(74) *Attorney, Agent, or Firm* — Fleit Gibbons Gutman Bongini Bianco PL; Thomas S. Grzesik

(57) ABSTRACT

A computer application displayed document such as a Web Page, is manipulated by dragging snippets to and from graphically depicted icons created by the application. The snippets preferably comprise links to the original content for communicating with the content source and/or restoring removed snippets to the displayed document. Preferably links are maintained semantically using RDF and DOM technology.

33 Claims, 17 Drawing Sheets

(56) References Cited

U.S. PATENT DOCUMENTS

| | | |
|---|---|---|
| 2004/0100501 A1* | 5/2004 | Dornback .................... 345/769 |
| 2005/0138554 A1* | 6/2005 | Bell et al. .................... 715/530 |
| 2005/0149871 A1 | 7/2005 | Broman et al. .............. 715/724 |
| 2005/0188051 A1* | 8/2005 | Sneh ............................ 709/213 |
| 2005/0193323 A1 | 9/2005 | Coulomb et al. ......... 715/501.1 |
| 2005/0240857 A1* | 10/2005 | Benedict ............ G06F 17/3089 |
| | | 715/205 |
| 2006/0015818 A1* | 1/2006 | Chaudhri ............. G06F 3/0481 |
| | | 715/779 |
| 2006/0069986 A1* | 3/2006 | Sandoval .................... 715/517 |
| 2006/0129945 A1* | 6/2006 | Dettinger et al. ........... 715/769 |
| 2006/0277481 A1* | 12/2006 | Forstall et al. .............. 715/764 |

* cited by examiner

```
<div fragment="01"
ref="http://www.somesite.com/page/fragment/001.xml">
...
</div>
```

FIG. 12A

```
<div class="fragment" href="http://www.somesite.com/fragment_001.xml">
<tag title="Weather"/>
<tag title="Boston"/>
...
</div>
```

FIG. 12B

USER DRIVEN COMPUTERIZED SELECTION, CATEGORIZATION, AND LAYOUT OF LIVE CONTENT COMPONENTS

FIELD OF THE INVENTION

The present invention is related to manipulation of displayed electronic documents and more particularly to GUI controlled editing of local presentation of shared remote electronic documents.

BACKGROUND OF THE INVENTION

U.S. Pat. No. 6,931,600: "Integrating into an application objects that are provided over a network" to Pittman, filed Jan. 6, 2001 and incorporated herein by reference discloses a mechanism for integrating into a scene at a client an object that is defined by a set of data. The scene is displayed in a first display region of a display device. A selectable item is displayed in a second display region of the display device. The selectable item corresponds to the object but is generated based on less data than the set of data defining the object. User input is received that selects the selectable item displayed within the second display region for incorporation into the scene. In response to receiving the user input, the set of data is retrieved and the object is generated on the client based on the set of data and displayed within the scene in the first display region of the display device.

U.S. Pat. No. 6,122,647: "Dynamic generation of contextual links in hypertext documents" to Horowitz et. al., filed May 15, 1998 and incorporated herein by reference discloses creating contextual hypertext links relevant to a user-selected portion of a source document. The contextual links enable the user to dynamically associate the source document with any available target document, regardless of whether links where created between the source document and the target document when the source document was created. The method includes selecting terms relevant to the user-selected portion by linguistic analysis which selects the most frequently occurring terms. From the selected terms target documents relevant to the selected terms are identified. The target documents are selected by identifying topics that are associated with, or described by, the selected terms. Contextual links are created between the selected terms and target documents associated with the identified topics using the URLs for the documents in the contextual links. The system includes a knowledge base of topics, including hierarchical relations between topics, and associations of topics and terms. A document collection includes documents and references to documents, and URL or other addressing information for the documents. A tagging module receives a user-selected portion and selects terms to be used for the contextual links. A presentation module identifies the topics in the knowledge base associated with the selected terms, the documents associated with each topic, and creates the hypertext links between the terms and the documents.

U.S. Pat. No. 5,367,621: "Data processing method to provide a generalized link from a reference point in an on-line book to an arbitrary multimedia object which can be dynamically updated" to Cohen et. al., filed Sep. 6, 1991 and incorporated herein by reference discloses providing a generalized link in a data processing system to enable referencing from a point within an organized hierarchy of an on-line softcopy text, to an arbitrary multimedia object. The multimedia object may be represented by data which is also contained within the softcopy book or alternately which may be separate from the book as a separate file or a separate database. This enables an author at the time of writing the softcopy book, to specify specific multimedia hardware and software support for the display of multimedia presentations accompanying the text in the book. Provision is made for the author to specify alternate forms of multimedia presentation, where a particular specified multimedia apparatus or supporting software is not present at a workstation. An improved method for dynamically updating a softcopy book to a new edition is also disclosed.

None of these provide a user friendly experience in manipulating displayed documents created from remote components.

SUMMARY OF THE INVENTION

The above as well as additional objectives, features, and advantages of the present invention will become apparent in the following written description.

It is therefore, an object of the present invention to programmably edit a displayed document, the displayed document comprising a visual representation derived any one of statically or dynamically from one or more associated source components, by concurrently displaying all or a section of the document and one or more widgets at a computer screen, responsive to a users input, selecting a portion of the displayed document, responsive to the users input, associating the selected portion (snippet) with a first widget of the one or more widgets, and responsive to associating the selected portion with the first widget, performing a function associated with the first widget.

It is another object of the invention to edit the document wherein a source component of the one or more source component is any one of text, an image, an animation, a video, a vector graphic, xml, an RSS feed or HTML.

It is still another object of the invention to determine the portion to be selected by detecting user GUI cursor placement within the displayed document, to drag the selected portion to a first widget of the one or more widgets, to drop the selected portion at the first widget, and to save the selected portion wherein the one or more widgets are visual representations of folder tabs.

It is still another object of the invention to perform a function associated with the first widget consisting of any one of the further steps of: copying the selected portion into a file, hiding the selected portion from the displayed document, deleting the selected portion from the displayed document, marking the displayed document at the location of the selected portion, posting the selected portion to a subscription feed (RSS), performing a translation of the selected portion into an image form, performing a translation of the selected portion into an animated visual form, performing a predefined action based on the selected portion, performing a translation of the selected portion to another language, performing a translation of the selected portion into an audio form or performing a translation of the selected portion into a textual form.

It is yet another object of the invention to perform any one of the further steps of: any one of creating or maintaining a link between the selected portion and the displayed document, communicating changes of a first document to a second document, the first document consisting of any one of a saved selected portion, a source document of a saved selected portion, the selected portion of the displayed document or the selected portion, the second document consisting of any one of the saved selected portion, the source document of the saved selected portion, the selected portion of the displayed document or the selected portion.

It is another object of the invention to the changes of the first document in the second document when the second document is displayed.

It is another object of the invention to select a second widget of the one of more widgets wherein the second widget is any one of the first widget or any other widget of the one or more widgets, responsive to selecting the second widget displaying one or more representations of saved document portions, associating a first representation of the one or more representations of saved document portions with a location in the displayed document, and responsive to the associating step, inserting the saved document portion of the first representation into the displayed document at the location in the displayed document.

It is another object of the invention to re-display the displayed document after the performing step, the re-displayed document reflecting changes to the displayed document resulting from the performing step.

It is yet another object of the invention redisplay by collapsing the displayed document to hide the portion dragged from the displayed document, marking the displayed document to indicate that any one of a change has been made or the location of a change that has been made and expanding the displayed document to include the inserted document in the displayed document.

It is still another object of the invention to determine the first representation the saved document portion to be selected by detecting user GUI cursor placement within the one or more representations of saved document portions, to drag the selected first representation to the location of the displayed document; and to drop the selected first representation at location of the displayed document.

It is still another object of the invention to provide the one or more widgets as visual representations of folder tabs.

It is even another object of the invention to create or maintain a link between the represented saved document portions and a corresponding one or more associated source components, the source components comprising any one of a shared original file, a shared original file component, a feed or a database, the shared original file including a shared portion that mirrors the represented saved document portions, the shared original file portion comprising a portion of the shared original file and to communicate any one of changes of the represented saved document portions to the associated source component or changes of the associated source component to the represented saved document portions.

It is still another object of the invention to responsive to a user action, enable the link or disable the link.

It is still another object of the invention to, in any one of the represented saved document portions reflect changes of the associated source component when the represented saved document is displayed or the associated source component reflects changes of the represented saved document portions when the associated source component is displayed.

It is still another object of the invention to re-display the displayed document after the inserting step, the re-displayed document reflecting changes to the displayed document resulting from the performing step.

Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 12A-12B depict program listing examples; and

DESCRIPTION OF THE PREFERRED EMBODIMENTS

Figure 9:
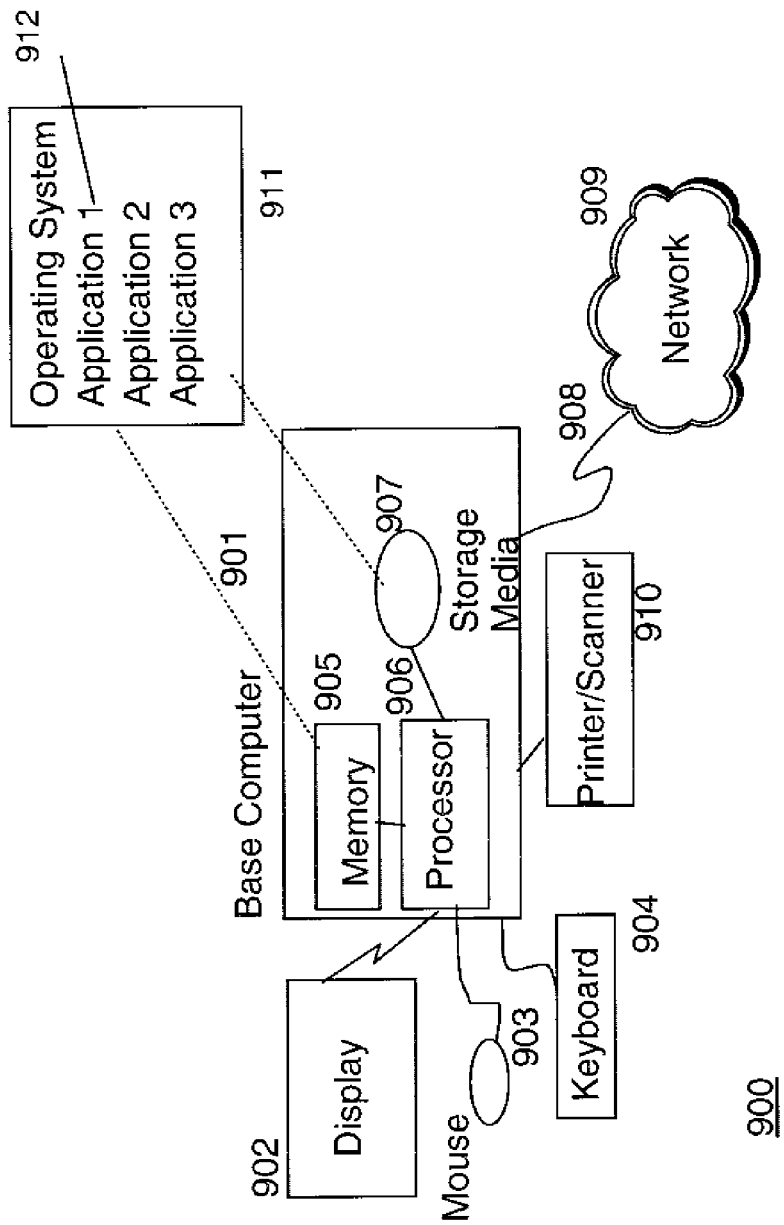
FIG. 9 is a diagram depicting an example computer system of the prior art.

FIG. 9 illustrates a representative workstation or server hardware system in which the present invention may be practiced. The system 900 of FIG. 9 comprises a representative computer system 901, such as a personal computer, a workstation or a server, including optional peripheral devices. The workstation 901 includes one or more processors 906 and a bus employed to connect and enable communication between the processor(s) 906 and the other components of the system 901 in accordance with known techniques. The bus connects the processor 906 to memory 905 and long-term storage 907 which can include a hard drive, diskette drive or tape drive for example. The system 901 might also include a user interface adapter, which connects the microprocessor 906 via the bus to one or more interface devices, such as a keyboard 904, mouse 903, a Printer/scanner 910 and/or other interface devices, which can be any user interface device, such as a touch sensitive screen, digitized entry pad, etc. The bus also connects a display device 902, such as an LCD screen or monitor, to the microprocessor 906 via a display adapter.

The system 901 may communicate with other computers or networks of computers by way of a network adapter capable of communicating 908 with a network 909. Example network adapters are communications channels, token ring, Ethernet or modems. Alternatively, the workstation 901 may communicate using a wireless interface, such as a CDPD (cellular digital packet data) card. The workstation 901 may be associated with such other computers in a Local Area Network (LAN) or a Wide Area Network (WAN), or the workstation 901 can be a client in a client/server arrangement with another computer, etc. All of these configurations, as well as the appropriate communications hardware and software, are known in the art.

Figure 10:
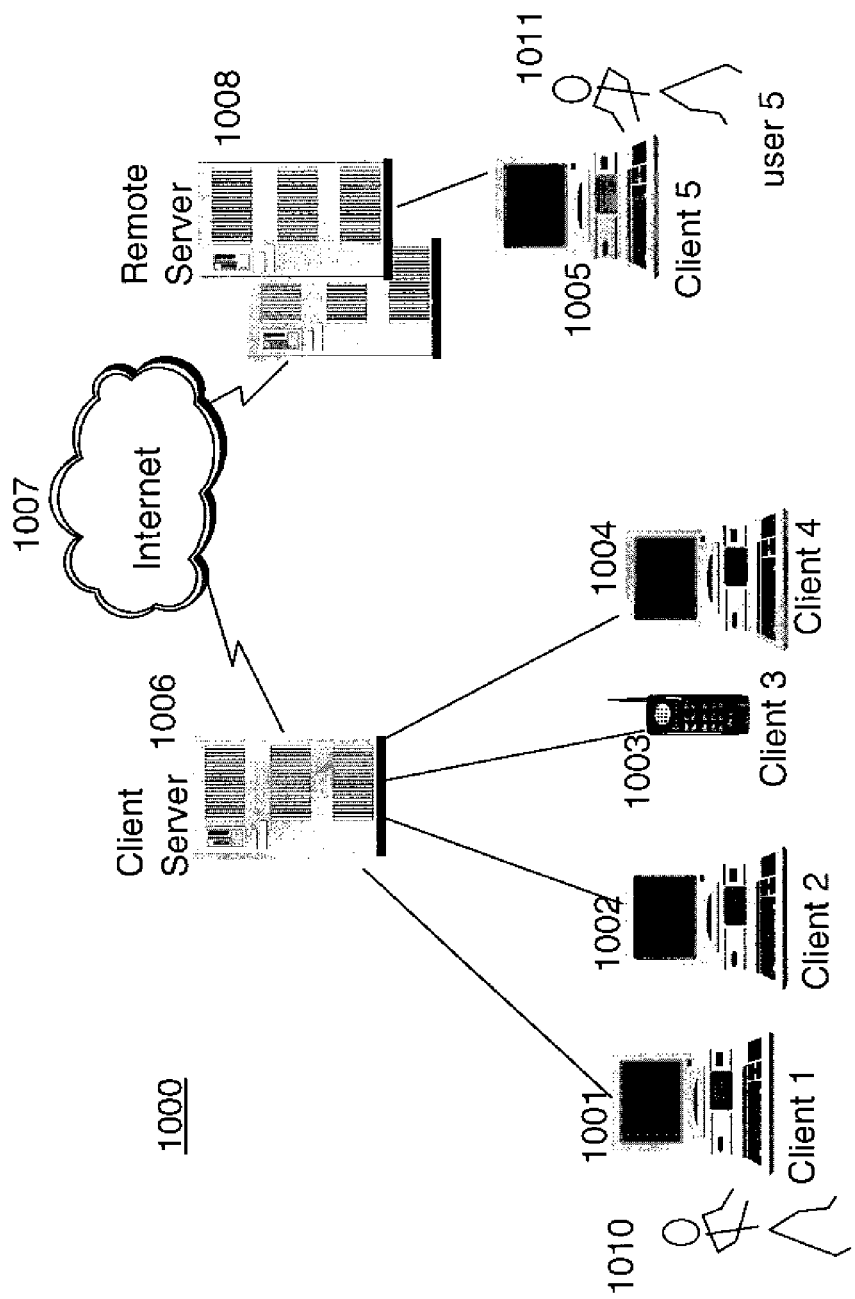
FIG. 10 is a diagram depicting an example network of interconnected computer systems of the prior art.

FIG. 10 illustrates a data processing network 1000 in which the present invention may be practiced. The data processing network 1000 may include a plurality of individual networks, such as a wireless network and a wired network, each of which may include a plurality of individual workstations 901 1001 1002 1003 1004. Additionally, as those skilled in the art will appreciate, one or more LANs may be included, where a LAN may comprise a plurality of intelligent workstations coupled to a host processor.

Still referring to FIG. 10, the networks may also include mainframe computers or servers, such as a gateway computer (client server 1006) or application server (remote server 1008 which may access a data repository and may also be accessed directly from a workstation 1005). A gateway computer 1006 serves as a point of entry into each network 1007. A gateway is needed when connecting one networking protocol to another. The gateway 1006 may be preferably coupled to another network (the Internet 1007 for example) by means of a communications link. The gateway 1006 may also be directly coupled to one or more workstations 901 1001 1002 1003 1004 using a communications link. The gateway computer may be implemented utilizing an IBM eServer zSeries® 900 Server available from IBM Corp.

Software programming code which embodies the present invention is typically accessed by the processor 906 of the system 901 from long-term storage media 907, such as a CD-ROM drive or hard drive. The software programming code may be embodied on any of a variety of known media for use with a data processing system, such as a diskette, hard drive, or CD-ROM. The code may be distributed on such media, or may be distributed to users 1010 1011 from the memory or storage of one computer system over a network to other computer systems for use by users of such other systems.

Alternatively, the programming code 911 may be embodied in the memory 905, and accessed by the processor 906 using the processor bus. Such programming code includes an operating system which controls the function and interaction of the various computer components and one or more application programs 912. Program code is normally paged from dense storage media 907 to high-speed memory 905 where it is available for processing by the processor 906. The techniques and methods for embodying software programming code in memory, on physical media, and/or distributing software code via networks are well known and will not be further discussed herein.

The present invention may be practiced within a single computer or across a network of cooperating computers.

Client systems are often used to display documents. Such displayed documents may be provided in a variety of forms including HTML, PDF, a variety of Word Processor forms. In some cases such as HTML, a server provides views of a document available to the server to a plurality of clients. The presented document may be a static file or it may be a dynamically changing file. In one example, a plurality of clients have write access to the document such that when one client edits the document, all clients immediately see the edited document at their respective view. In this way, the document could show the current weather for a certain geographical location. Such documents may be text only, or some combination of text and graphics.

The present invention provides for taking portions (snippets) of an electronic document (web page for example) and copying them for later use. These snippets could include text, images, animations, videos, vector graphics, etc. as well as the markup used to render them appropriately. This use would not only be for the static markup from the original page, but also include the ability to update the content dynamically if any critical content has changed. For instance, temperature, stock quotes, headlines, etc can be copied from an existing page and the content may include the link back to the source site to get updates on a regular basis. Being able to maintain the link to the original server is important for a number of reasons. Not only can the content be "live" (such as real-time stock quotes) but the publisher of that content can be informed via link information) of who is subscribing to their data. Systems today enable very sophisticated techniques for grabbing the underlying HTML and storing it away. For instance the Scrapbook extension for the Firefox browser allows the user to save snippets of a web page via cut and paste software. It does not however, maintain the snippet's original link back to the server.

In addition to static documents, the original document can be a live document (in the sense that it is dynamically generated) such as a document presenting information from a database. As content changes, so does the live page that is presented. Without additional tooling, a snippet can retrieve the page, parse it and update the appropriate snippet content as it changes over time. In another embodiment syntax is provided for communication between the provider and consumer of the information. This embodiment would allow the provider to know who and what is being monitored from their document. This can provide valuable feedback as to the most widely read portions of their content. On the consumer side, the parsing of the document would be more robust and less likely to update the content improperly.

RSS feeds (Really Simple Syndication) are an XML format for sharing and distributing information. They are a way for users to get updates to information from a provider to which they have subscribed. One embodiment would use these XML feeds as a live source document.

Alternatively, the user can choose to break the connection with the source document and save the version that was originally captured.

New tools including Semantic Web and Resource Description Framework (RDF) according to the W3C® standards body provide improved technology which can be advantageously employed to enable a wide range of use of snippets. In an example, a snippets application could provide a "dashboard" that the user can customize where a dashboard is a visualization pallet for manipulating snippets of a document. A snippet application could provide a way to create live collections of pieces of disparate web sites.

Preferably a web page of an electronic document is comprised of special markup on the web page. The special markup can be provided by either the content provider or an intermediate proxy server. This markup preferably includes RDF elements that semantically tag the content of the page and provides a description of how to update the information from the provider. Given this markup and the existing state of the art of grabbing markup, this invention provides a space for the collection of these snippets. This space, or dashboard, is preferably populated with a set of web snippets that maintain their link to the original provider and can automatically or on user request, update the data that they present. A user can mark and drag a visualized portion of a site (or the complete page) to their dashboard. The dashboard view preferably allows for multiple pages or snippets of content and provides sub-collections of data e.g., stocks, weather, etc.

In addition to the RDF that supports the mechanism to request new data, snippet metadata also includes information on how to display itself in various configurations, e.g., as a single line of text, small thumbnail, medium thumbnail or original presentation.

Preferably, the dashboard and its metadata can be saved and restored using window GUI radio buttons as is well known in the art. In one embodiment, page numbers are maintained in the displayed page even when snippets are added or subtracted from the page. Preferably page numbers are augmented with additional page numbering techniques. Thus a page 12 that expands to 3 pages when snippets are added is renumbered to 12.1, 12.2 and 12.3. When page 12 is completely removed, page number 13 follows page number 11.

In one embodiment, locations of removed snippets or pages are represented by a visual effect such as a horizontal line, a shaded rectangle, full-size blank or color. Preferably, the removed portions can be viewed (preferably in a new window or by restoring the content to the view in the original document) by clicking on the visual effect.

Preferably snippets added to the document are marked by box, vertical sidebar, color text, special font, underline text, shaded background, color background or other indicators known in the art.

Preferably, updated information from the common source file may be highlighted by blinking or other means known in the art.

Snippets are preferably manipulated using a mouse-controlled curser by dragging to/from any one of an icon (tab), different pages, and different files.

Figure 1:
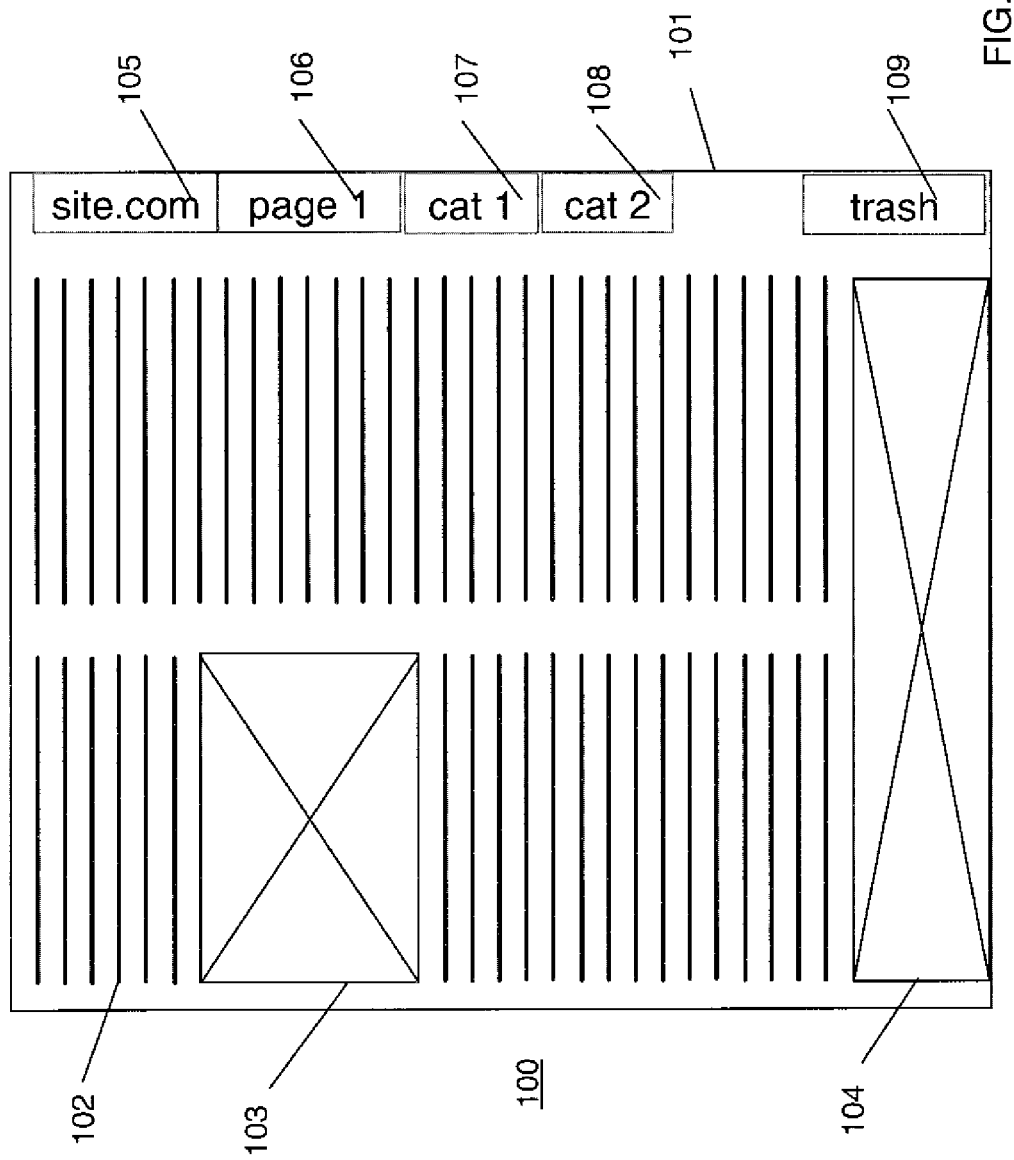
FIG. 1 is an example browser application window displaying a document according to the invention.

FIG. 1 depicts an exemplary browser application window 100 containing structured web content 101 that can include various displayable components including content 102 103 104 and application provided components 105 106 107 108 109 such as radio buttons, icons and the like. In this example, paragraphs of text depicted here by lines 102 and images 103 104 are provided as part of this content. Furthermore, icons (depicted as tabs 105 106 107 108 109 in our example) provide visualized operations or containers for the example application. Preferably the tabs 105 106 107 108 109 are HTML structure elements that a user can use to control the display of stored items. Not shown are radio buttons and hyperlinks well known in the art for providing to a human User, a GUI functionality to the application. The tabs 105 106 107 108 109 are controlled and configured through the browser application. These tabs 105 106 107 108 109 provide a user-friendly visualization facilitating the ability to store and retrieve structured content for example. Optionally, the browser application configuration allows these tabs 105 106 107 108 109 to be attached to any of the four sides of the browser window displayed application 101. In the present example, they are 'docked' to the right side of the folder image. Other implementations of icons to support the present invention other than folder tabs can be implemented to provide the function consistent with the teaching of the present invention. For one example, the page displayed could appear to be a page of a book icon and the trash tab could be displayed as a trashcan icon whereby the page is displayed on a screen having both a trashcan and a book icon displayed (not shown).

The tabs are preferably mapped to various categories. In the present example, the tabs 105 106 107 108 are defined by the User as collections of structure content. Tab 105 is named "site.com" since it provides access to structured content from a particular web site. Tab 106 is named "page 1" because is provides access to structured content from a particular web page. Tabs 107 and 108 area named "cat 1" and "cat 2" so as to provide access to structured content under two categories of information. Preferably a User can configure tabs of their choice to suit their information hierarchical needs.

Tab 109 is different from the other tabs in that it is provided by the application of the present invention for the purpose of selectively removing structured content from the content layout.

In addition to the removal (deletion) of content, other tabs may be provided to invoke other functionality. Examples of such functionality include, but are not limited to, the posting of the content to a subscription feed (RSS), applying a visual transform on the selected portion (change the text color, e.g., gray it out) or applying a content transform on the selected portion (e.g., translate to another language).

Figure 2:
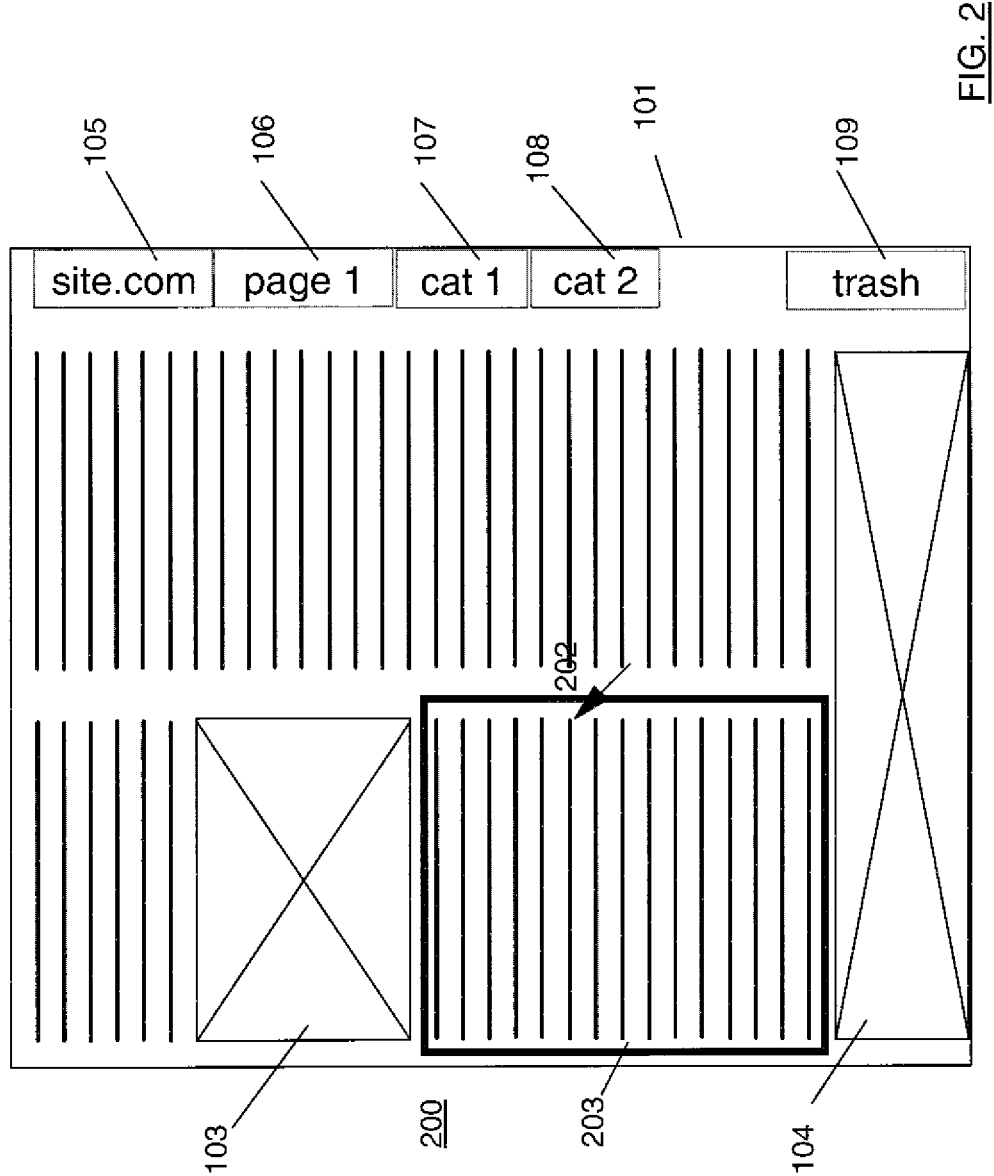
FIG. 2 depicts mouse-controlled curser selection in a browser window.

In FIG. 2, the User uses a computer mouse to move the curser 202 around the browser application window 101. As the curser 202 hovers over blocks of structured content, the application knows to highlight (paint) these blocks of content by using the underlying content containing elements of the DOM to establish block boundaries. In this example, a block of text 203 is highlighted as a result of the User "painting" the text inside the block. Typically, the text to be painted is selected by simultaneously holding a mouse key depressed while moving the mouse to control the position of the curser 202.

According to the W3C® Standard Working Group, the Document Object Model (DOM) is a platform- and language-neutral interface that will allow programs and scripts to dynamically access and update the content, structure and style of documents. The document can be further processed and the results of that processing can be incorporated back into the presented page. This is an overview of DOM-related materials here at W3C and around the web.

The W3C Document Object Model is a "platform- and language-neutral interface that will allow programs and scripts to dynamically access and update the content, structure and style of documents. The document can be further processed and the results of that processing can be incorporated back into the presented page."

"The goal of the DOM group is to define a programmatic interface for XML and HTML. The DOM is separated into three parts: Core, HTML, and XML. The Core DOM provides a low-level set of objects that can represent any structured document. While by itself this interface is capable of representing any HTML or XML document, the core interface is a compact and minimal design for manipulating the document's contents. Depending upon the DOM's usage, the core DOM interface may not be convenient or appropriate for all users. The HTML and XML specifications provide additional, higher-level interfaces that are used with the core specification to provide a more convenient view into the document. These specifications consist of objects and methods that provide easier and more direct access into the specific types of documents. Key industry players are participating in the DOM Working Group, including editors and contributors from ArborText, IBM, Inso EPS, JavaSoft, Microsoft, Netscape, Novell, the Object Management Group, SoftQuad, Sun Microsystems, Texcel, and W3C." The Chair of the W3C DOM WG is Lauren Wood of SoftQuad.

The DOM specification (according to the world wide web at "xml.coverpages.org/dom.html#intro" incorporated herein by reference) "defines the Document Object Model, a platform- and language-neutral interface that will allow programs and scripts to dynamically access and update the content, structure and style of documents. The Document Object Model provides a standard set of objects for representing HTML and XML documents, a standard model of how these objects can be combined, and a standard interface for accessing and manipulating them. Vendors can support the DOM as an interface to their proprietary data structures and APIs, and content authors can write to the standard DOM interfaces rather than product-specific APIs, thus increasing interoperability on the Web." [from WD-DOM-19980318]

DOM is being designed at several levels:

"Level 1. This concentrates on the actual core, HTML, and XML document models. It contains functionality for document navigation and manipulation.

Level 2. Includes a style sheet object model, and defines functionality for manipulating the style information attached to a document. It also enables traversals on the document, defines an event model and provides support for XML namespaces.

Level 3. Will address document loading and saving, as well as content models (such as DTDs and schemas) with document validation support. In addition, it will also address document views and formatting, key events and event groups. First public working drafts are available.

Further Levels. These may specify some interface with the possibly underlying window system, including some ways to prompt the user. They may also contain a query language interface, and address multithreading and synchronization, security, and repository.

"Dynamic HTML" is a term used by some vendors to describe the combination of HTML, style sheets and scripts that allows documents to be animated.

The Resource Description Framework (RDF) (also from W3C®) is a language for representing information about resources in the World Wide Web.

Figure 3:
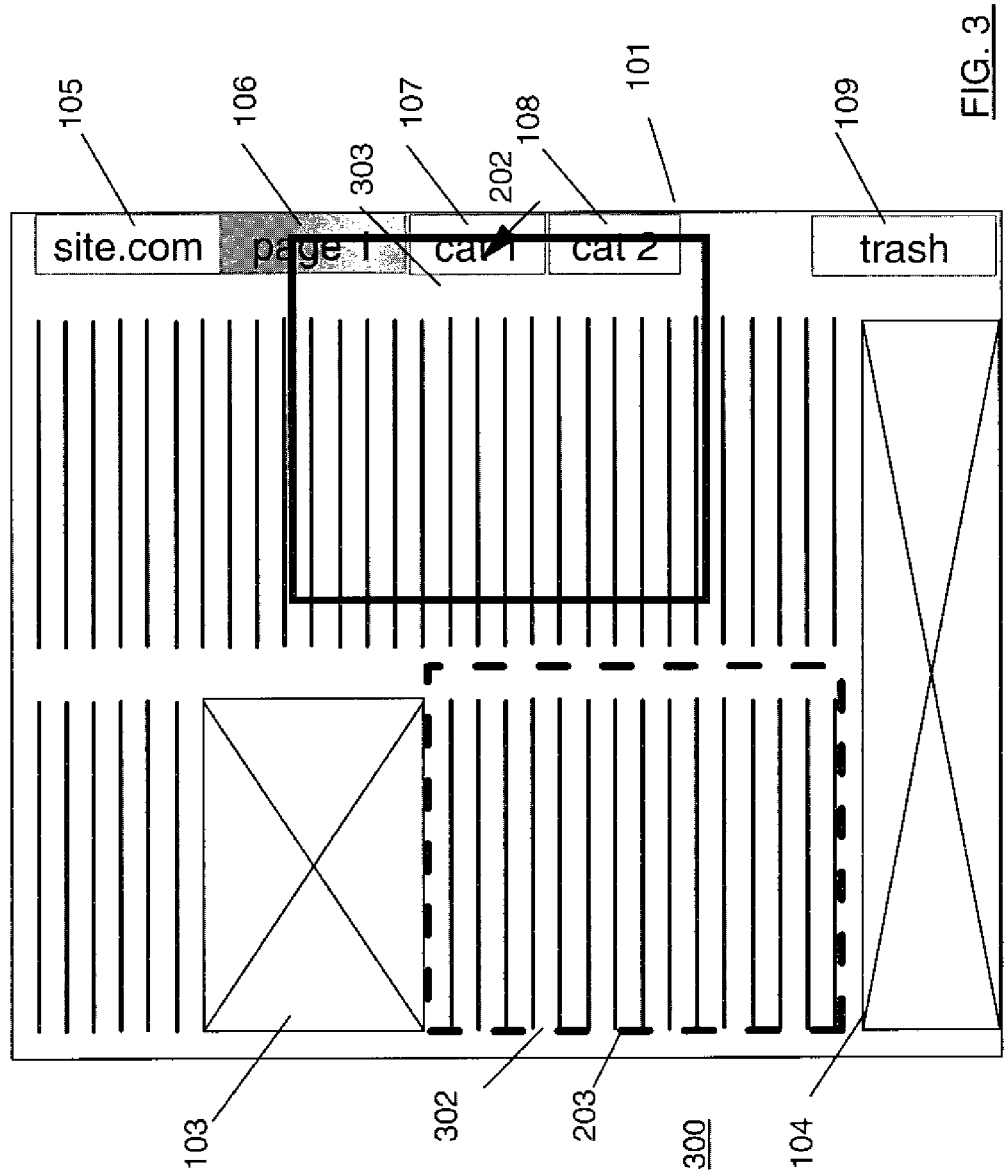
FIG. 3 depicts manipulating content of a browser window.

FIG. 3, depicts the selected block of text 203 within the web content layout within the browser application displayed 101, wherein the selected block 203 is then dragged 303 by the User manipulating the curser 202 onto any one of the tabs. As this dragged block of text 303 is moved over a tab 106, the application provides visual feedback to the User by highlighting the tab 106. If the User drops this dragged block of text 303 on the tab 106 (by releasing the mouse button), then the application knows to store this structured information under the category identified by the tab 106. Any metadata, such as the data used to identify the source of this block of content, the location within the web page and the time at which it was stored for example, is attached to the block of content preferably using RDF and stored along with the content. In one embodiment any standard non-visual metadata attached to the selected block of data within the web page is also stored with the content and metadata. The application itself preferably creates its own metadata connecting locally know system information with the selected block of content and this too is stored. This metadata preferably distinctly describes the selected content to the point of allowing the application, (or any application on the users system that understands it), to present semantic connections between various pieces of information. An example might be the selection of weather information from a web page that contains zip code metadata describing the related zip code of the forecast area. The application knows through locally stored information, that your zip code corresponds to that selected content's metadata and highlights it in a way known in the art. In a preferred embodiment, the layout of the remaining web content within the browser application window 101, is refreshed but without this selected block of text. Thus, in one embodiment the displayed document would either be collapsed around the area that originally contained the removed selected text 203, the area 203 would be overlaid with a blank object, the moved text would be modified to provide a lighter text, an underlined text, a colored text, a colored background or the like in the affected area 203.

In a preferred embodiment, sites use a standard markup for their content, enabling one to more easily identify the portion of the page that is of interest. One embodiment of this markup might be as shown in FIG. 12A:

This allows the client browser to identify fragments of information and how to update them at subsequent times using the HREF attribute. If that markup doesn't exist on the original page, when the user copies a fragment of the page, this meta-data associated with the page fragment can also be generated. The system can create the above markup. On a regular schedule, or on demand, the fragment can then be updated with the content that is currently on the site. Additional markers of where in the <HTML> tags the content could also be provided.

Semantic tags could also be added to the markup to indicate areas of interest. There could be 1 or more of these (e.g. FIG. 12B).

Then the fragment can be identified and more easily managed on the client side. This is just one example syntax of how this might be provided in the HTML delivered to the browser, any number of syntaxes are possible within the teaching of the present invention.

Additional information that might be provided or inferred is how to display the fragment (snippet) in other situations, such as a "1 liner", a thumbnail, etc well known in the art. These presentations could be used as a scrapbook to provide an outline of what has been previously captured.

Semantic links to snippets could also be used to improve a web searching user experience. In an embodiment, before surfing the web, the user could identify areas of interest (or tags). When a properly tagged page appears, the browser could then highlight those sections of the page that are important to the reader. This would provide a more intelligent" way to view web pages. An index of the relevant portions of the page could be provided in a separate overlay or sidebar (folder tab 107 108 for example in FIG. 1).

Figure 4:
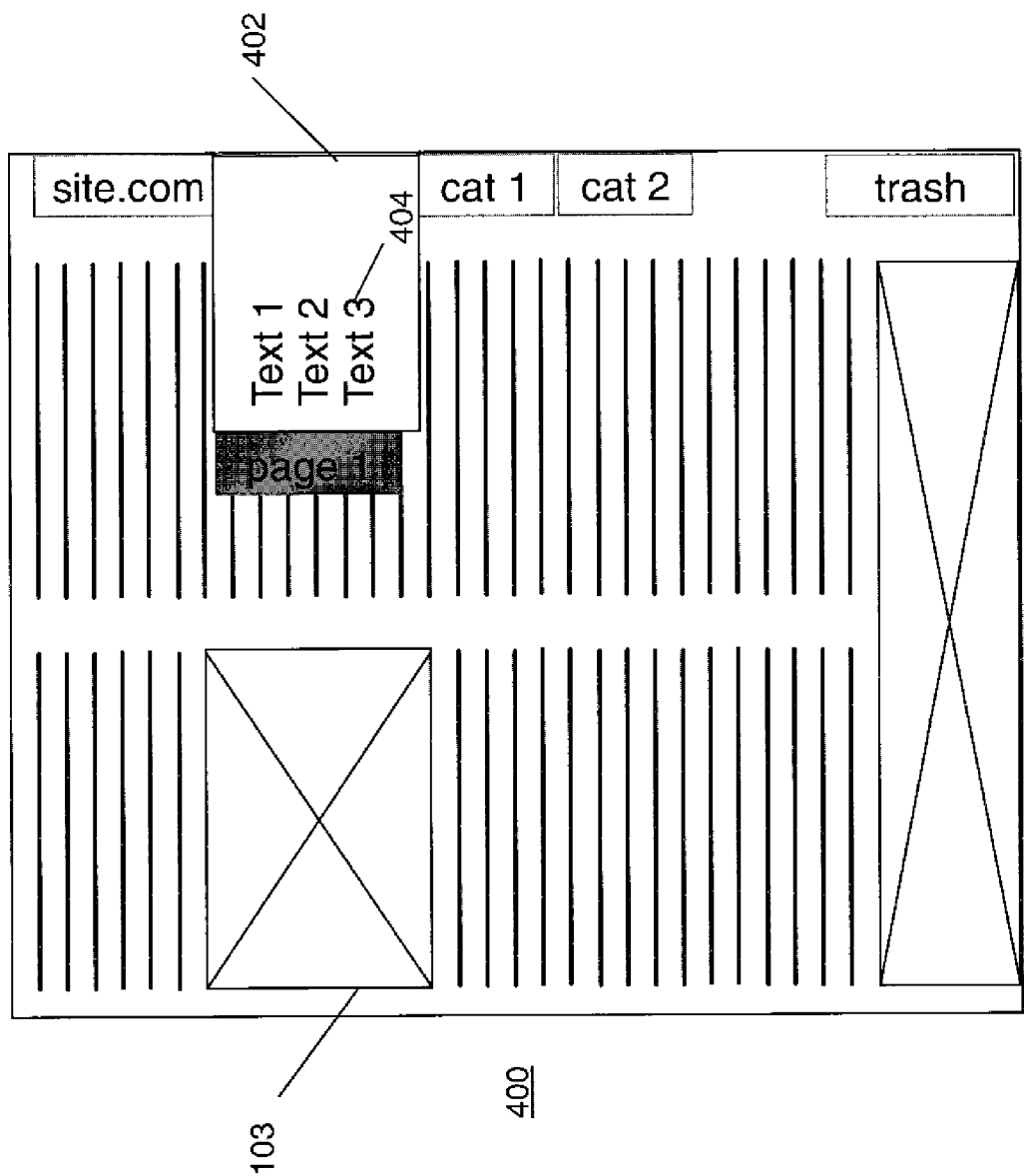
FIG. 4 depicts retrieval of text in a browser window.

FIG. 4 depicts an example of retrieving a block of text 402. Within the browser application 101, the User can click on a tab 106 to select it. This tells the application to "open the tab" to reveal a list 402 of items that link to the stored structured data within this category. The User can then click on any one 404 of these items 402 to retrieve the stored data associated with it. For example, the User uses his curser to select "Text 3" 404 which causes the application to display the saved content associated with Text 3. The application can configure the display of this list and the presentation of the structured data referred to by these list items in many ways. For example, if the list items in 402 are sorted by data, the last item "Text 3" 404 would contain the block of text we just stored. When the User clicks on this list item, another window within the browser application 101 is preferably displayed containing the retrieved text (not shown). Alternatively, the block of text is placed back into the flow of web content that it was taken from 203, using the location metadata that was stored with it, and highlighted by the application to indicate to the User that it is replaced text.

Figure 5:
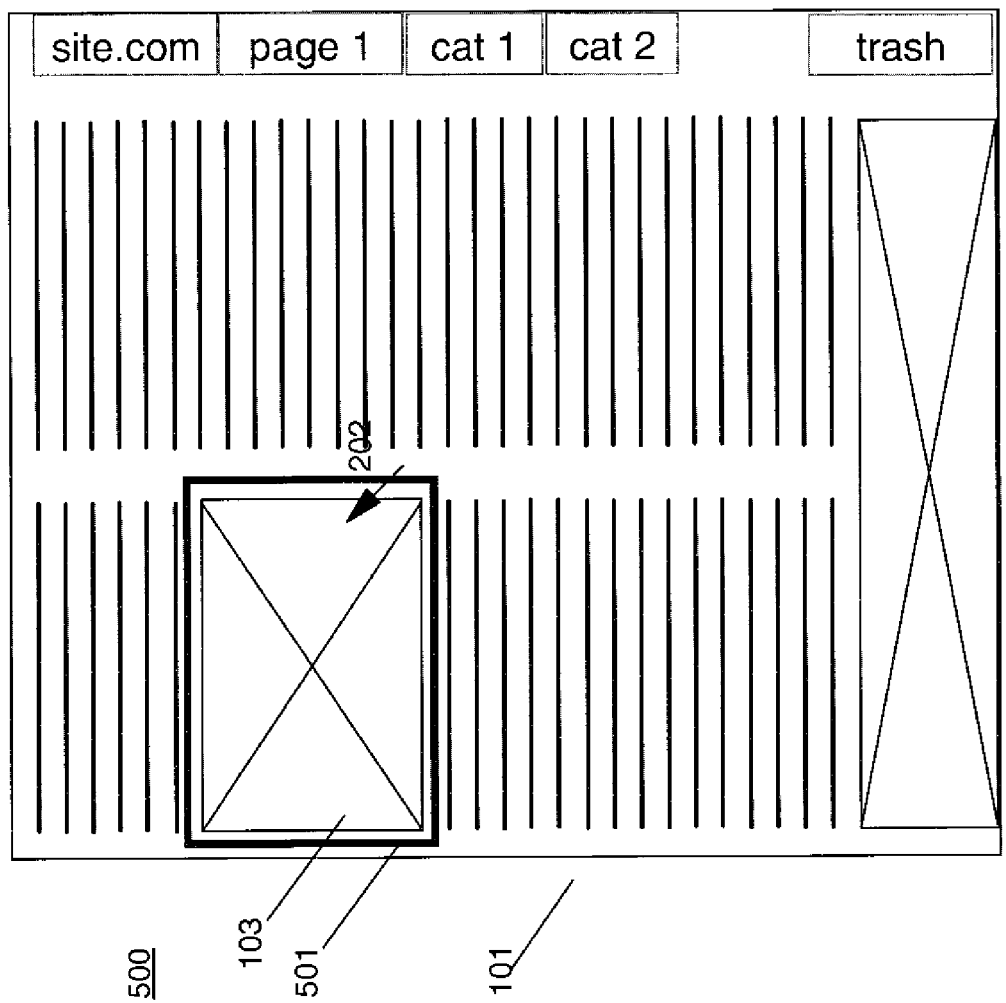
FIG. 5 depicts selecting a block of content.
Figure 6:
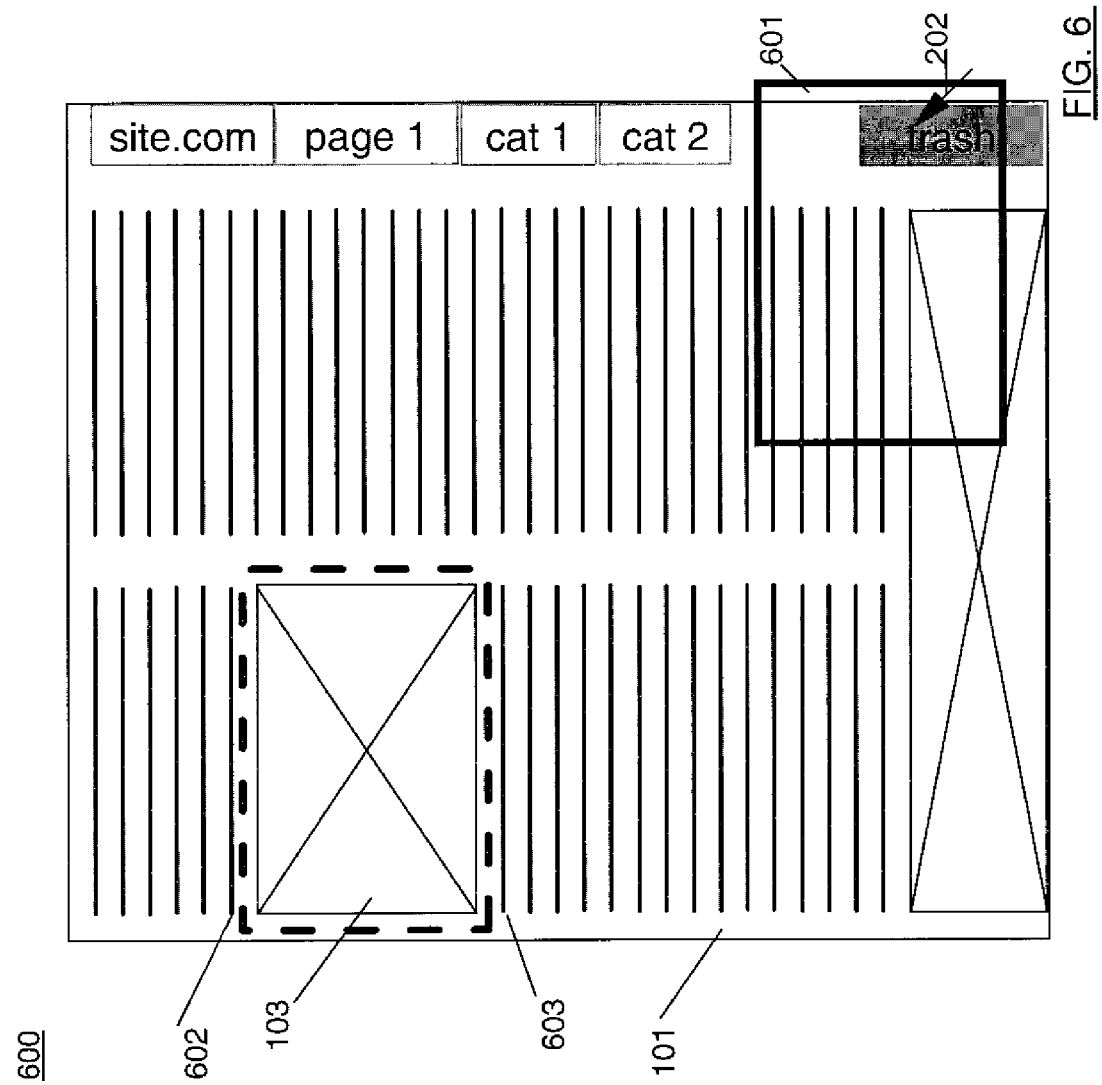
FIG. 6 depicts dragging a block of content.
Figure 7:
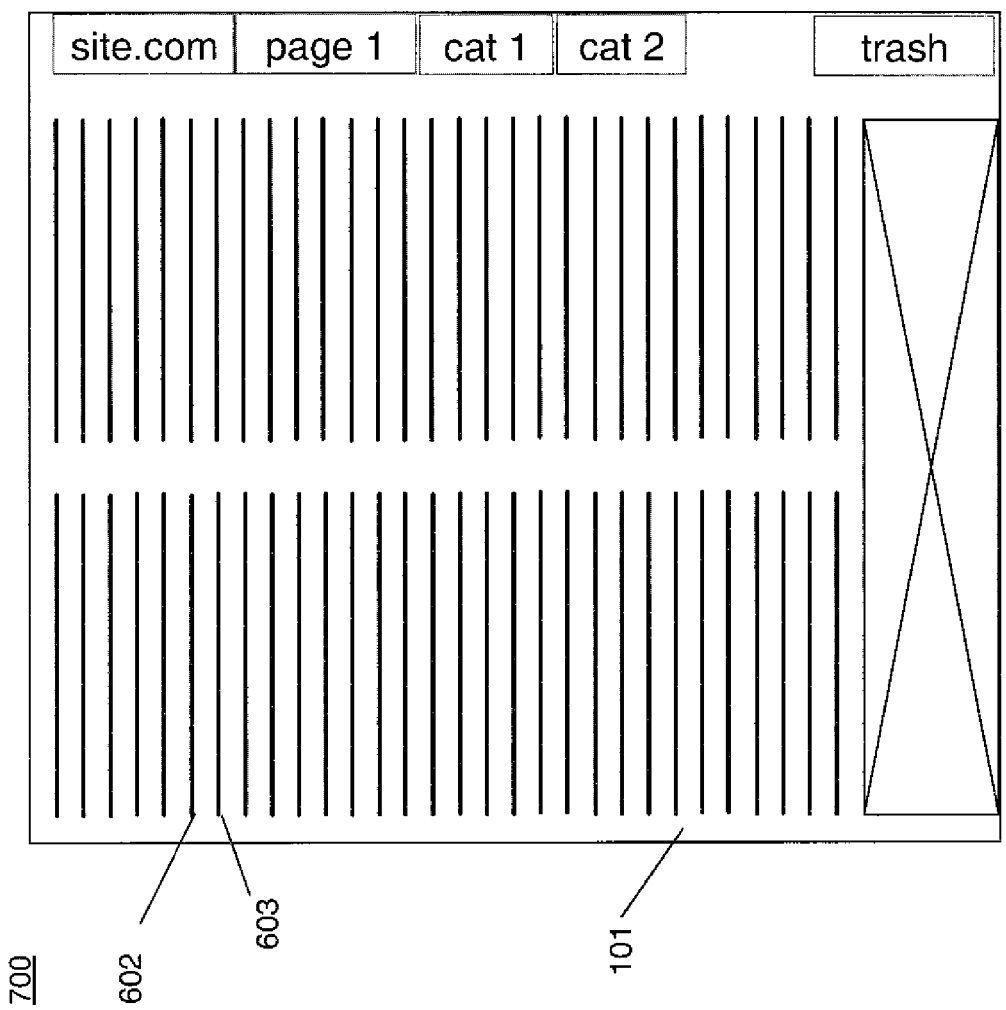
FIG. 7 depicts presenting a new layout of a displayed document.

Blocks of structured information can also be removed from the layout of the current web page. For example, the User finds the image (which presents a blinking advertisement) distracting to the flow of the content they need to focus on for the purposes of a client presentation. In an example depicted in FIG. 5, the User uses his cursor 202 to select the image 103 of a block of content. The application highlights the selection 501 in any of a number of ways well known in the art. FIG. 6 depicts an example of the User dragging the selected block of content (image) 103 onto 601 the 'trash' tab 109 using his mouse-controlled cursor 202. The application knows to remove that image from the displayed web content 103 in the browser application window whenever such content is dragged to the trash tab 109. FIG. 7 shows an example of the application 101 presenting a new layout of the existing web page content but without the distracting image using the underlying structure of the DOM. The lines of text 602 603 that surrounded the block of content 103 have collapsed as a result of the move to the trash tab 109. In one embodiment, a visual indication is provided that a collapse has taken place by shading the area collapsed. In our example, the space between lines 602 and 603 is shaded (not shown).

Figure 8:
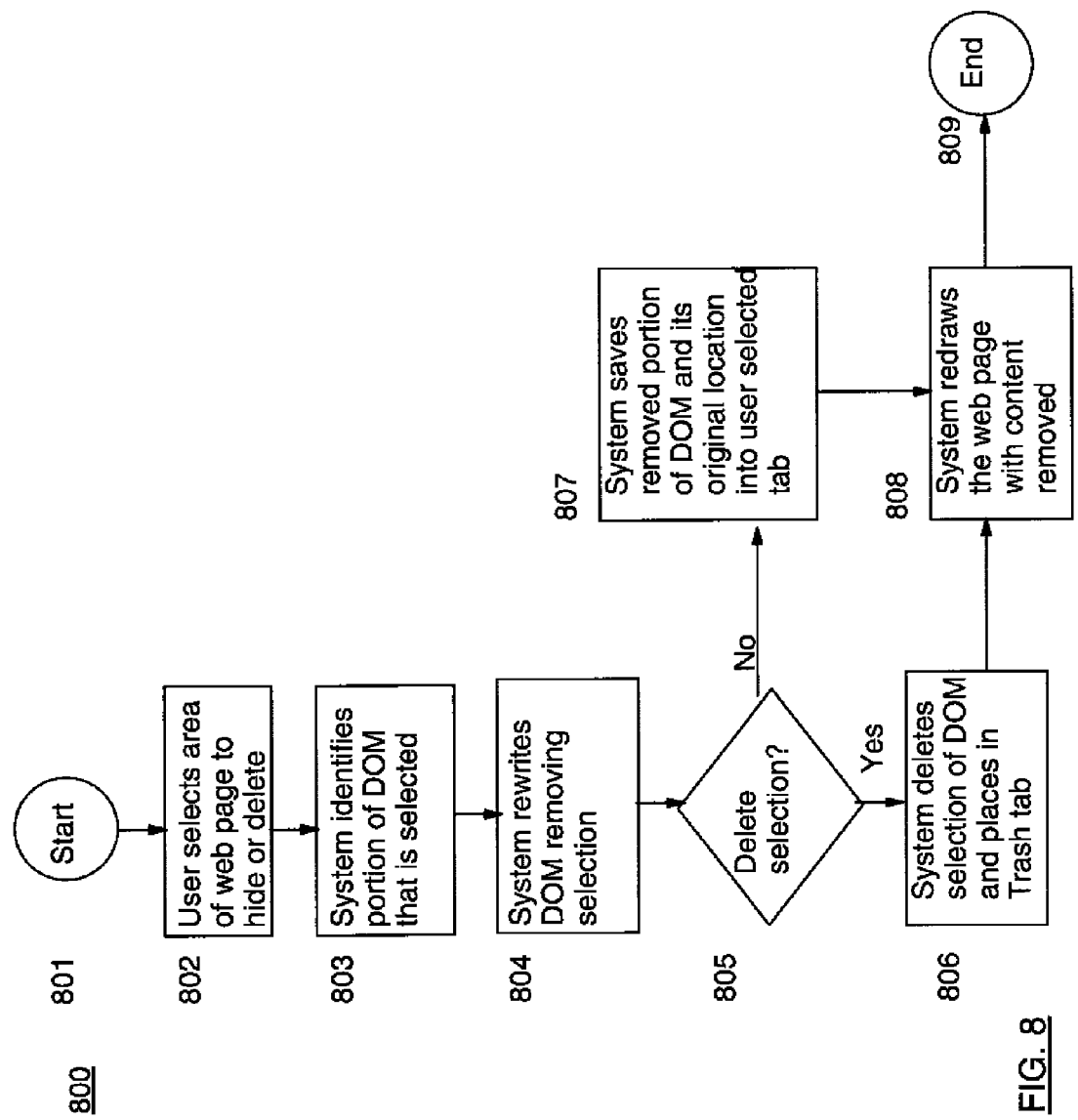
FIG. 8 depicts an example of hiding a block of a displayed document.

A flow diagram of the process for hiding a selected block of structured content on a web page is presented in FIG. 8. When 801 the user desires to delete an object the User uses the mouse to select an area on the web page to delete 802. Using the structure of the web content, the Document Object Model (DOM), the application identified what portion of the web page to store 803.

The application alters 804 the DOM of the web page excluding this identified portion.

If 805 the User selected area of text was dragged over the 'trash' tab, the decision 805 to delete 806 this identified section of DOM is true, while the identified portion is deleted from the existing web page DOM, the selected web content identified is stored under the 'trash' tab category.

If the decision 805 was not to delete the selected area of content from the DOM of the web page, then, the application saves 807 the identified portion of the DOM into the category identified by the tab chosen by the User. The location of where this area of content was taken from is also saved 807.

Next, the application redraws 808 the altered DOM of the web page so that the selected portion of content is not shown.

Figure 11:
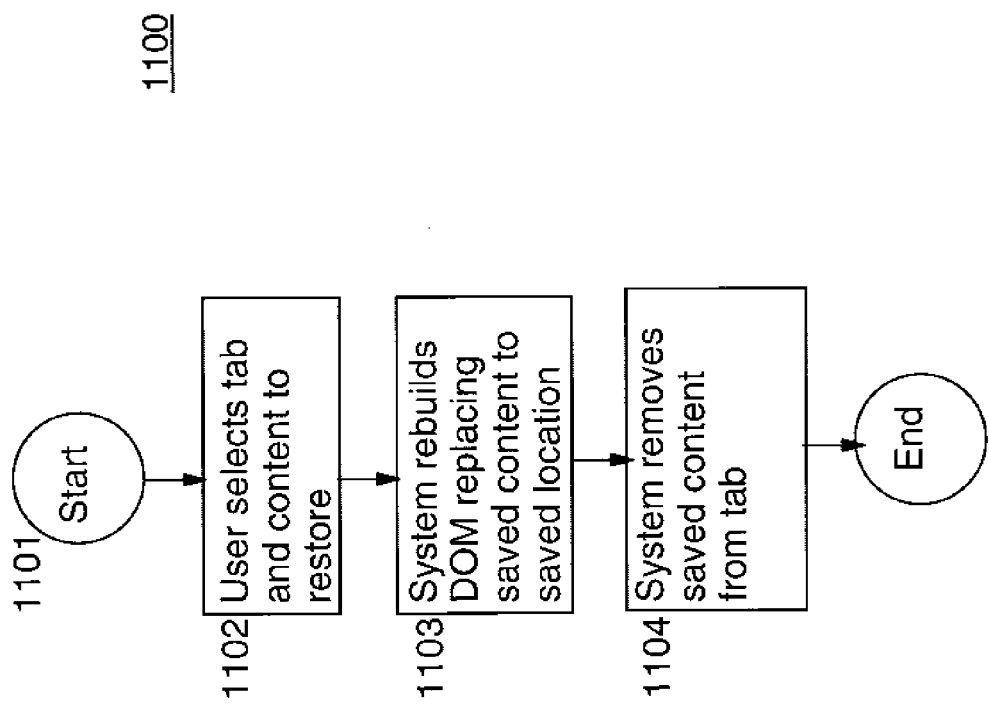
FIG. 11 depicts displaying blocks of restored content.

The flow diagram for the restoration of stored content is presented in FIG. 11. Starting from 1101, the User selects a tab to open 1102, then selects a link 1102 item from the listed items of stored content that should be restored.

The application uses the stored location associated with this stored data 1103 to determine which web page DOM to which to restore the stored content before displaying the updated web page content. Alternatively, this application might restore the stored content on its own to a separate window or even within an entirely different web page DOM.

Once the stores data has been restored, the application removes it from the store so that it disappears from the list in under the tab category in 1104. The process flow ends.

Figure 13:
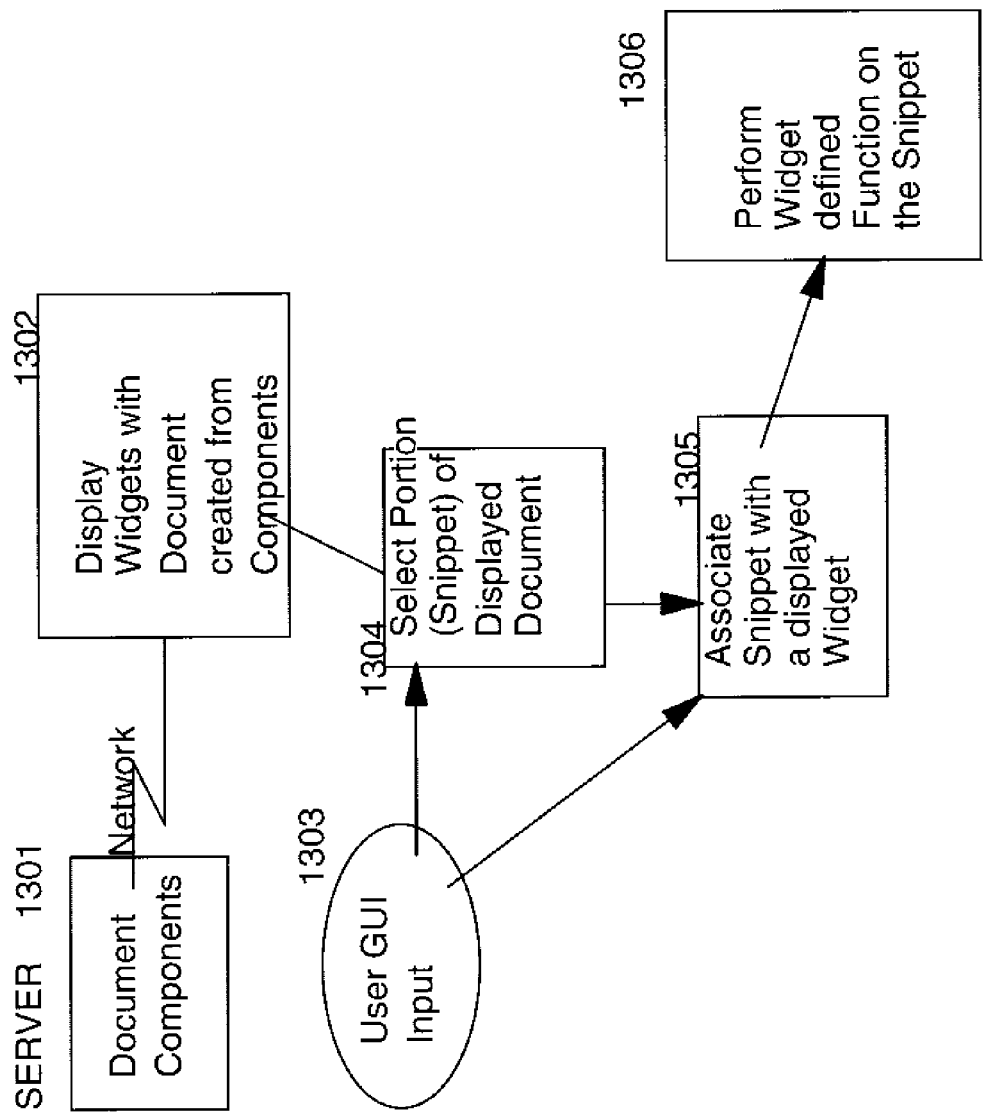
FIGS. 13-17 depicting example flow diagrams for performing the invention.

Referring to FIG. 13, the present invention provides a user with the ability to programmably edit a displayed document, the displayed document comprising a visual representation derived any one of statically or dynamically from one or more associated source components 1301, by concurrently displaying 1302 all or a section of the document and one or more widgets at a computer screen, responsive to a users input 1303, selecting 1304 a portion of the displayed document, responsive to the users input 1303, associating 1305 the selected portion (snippet) with a first widget of the one or more widgets, and responsive to associating the selected portion with the first widget, performing 1306 a function associated with the first widget.

The invention enables a user to edit the document wherein a source component 1301 of the one or more source component is any one of text, an image, an animation, a video, a vector graphic, xml, an RSS feed or HTML.

Figure 14:
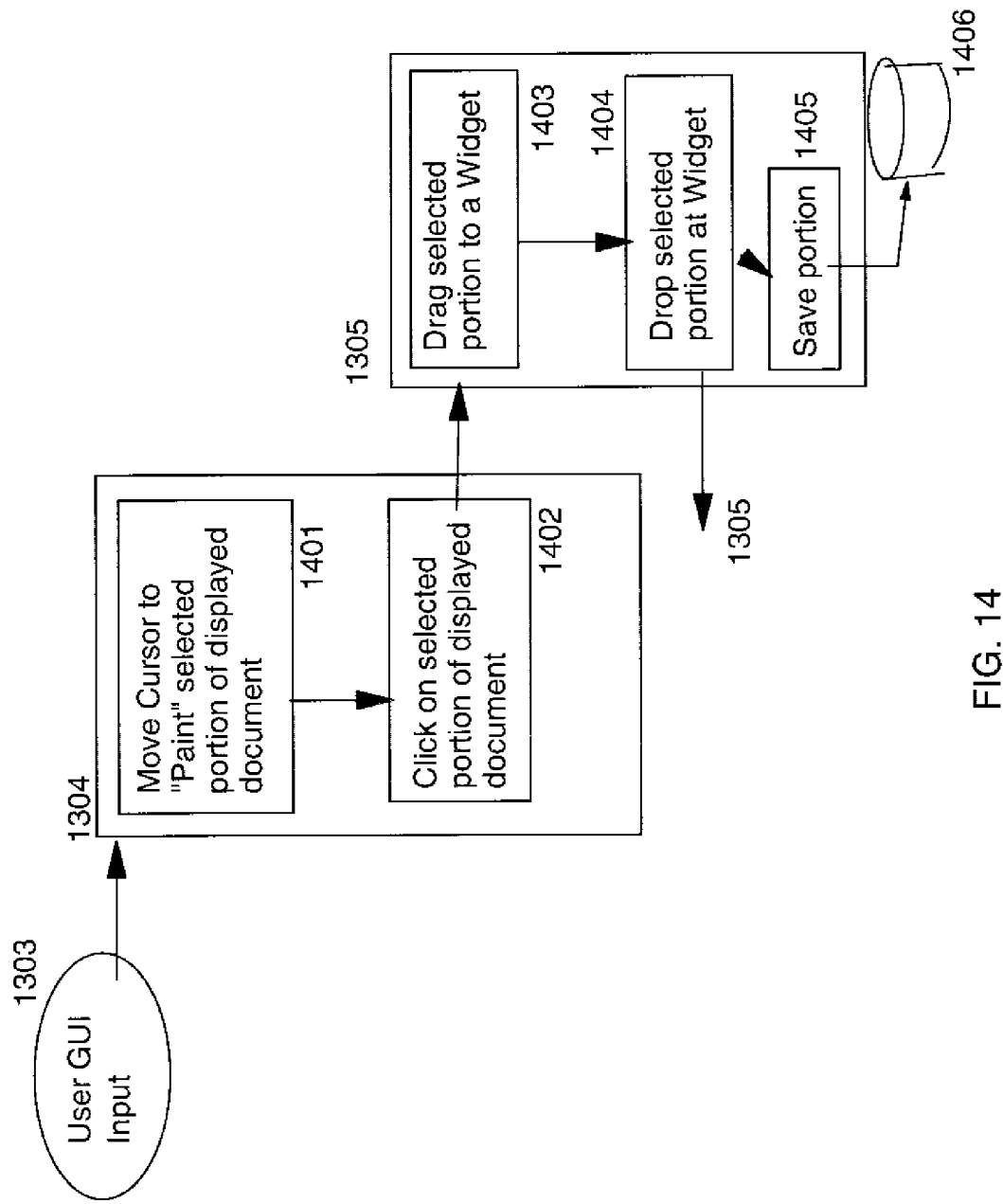

The user (referring to FIG. 14) is enabled to determine 1401 the portion to be selected 1402 by detecting user GUI cursor placement 1304 within the displayed document, to drag 1403 the selected 1402 portion to a first widget of the one or more widgets, to drop 1404 the selected portion at the first widget, and to save 1405 (in a file 1406 for example) the selected portion wherein the one or more widgets are visual representations of folder tabs.

Figure 15:
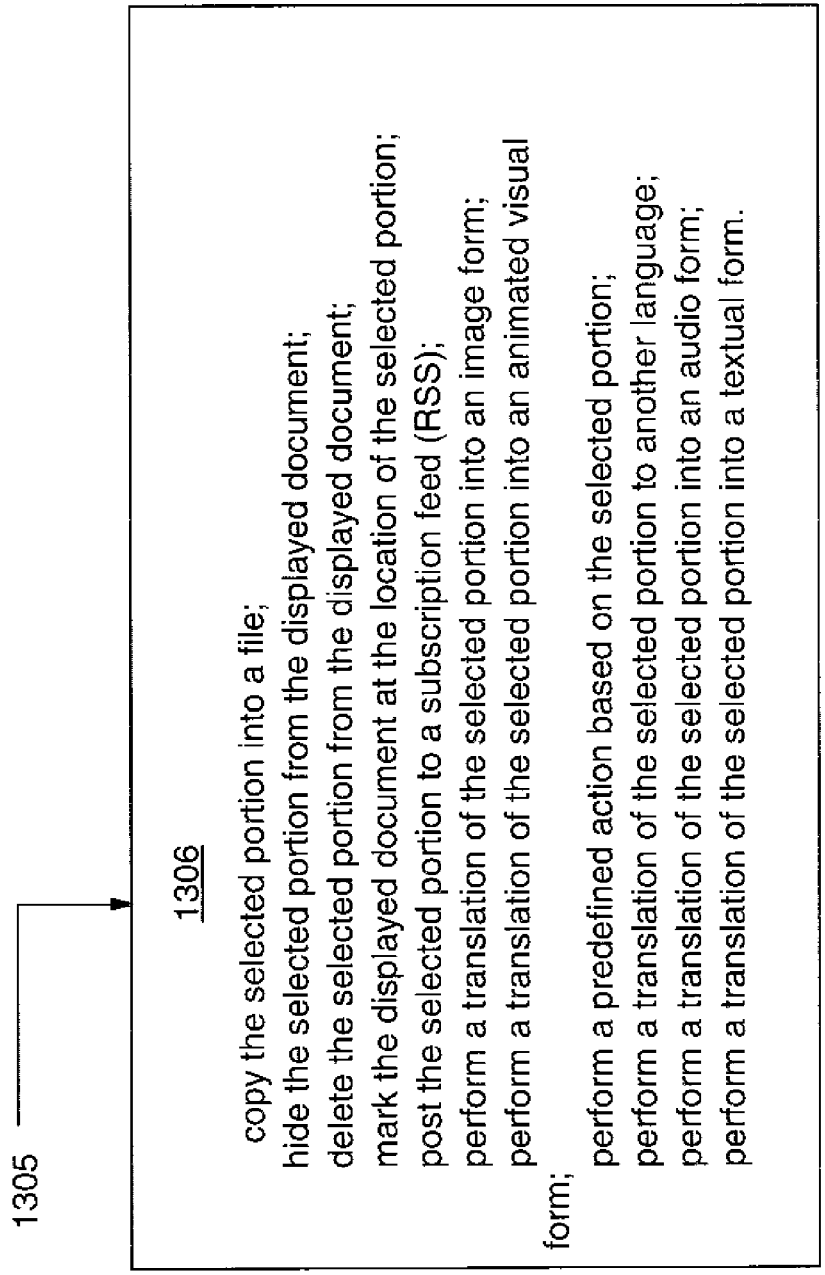

Referring to FIG. 15, preferably a function 1306 is performed associated with the first widget consisting of any one of the further steps of: copying the selected portion into a file, hiding the selected portion from the displayed document, deleting the selected portion from the displayed document, marking the displayed document at the location of the selected portion, posting the selected portion to a subscription feed (RSS), performing a translation of the selected portion into an image form, performing a translation of the selected portion into an animated visual form, performing a predefined action based on the selected portion, performing a translation of the selected portion to another language, performing a translation of the selected portion into an audio form or performing a translation of the selected portion into a textual form.

Figure 16:
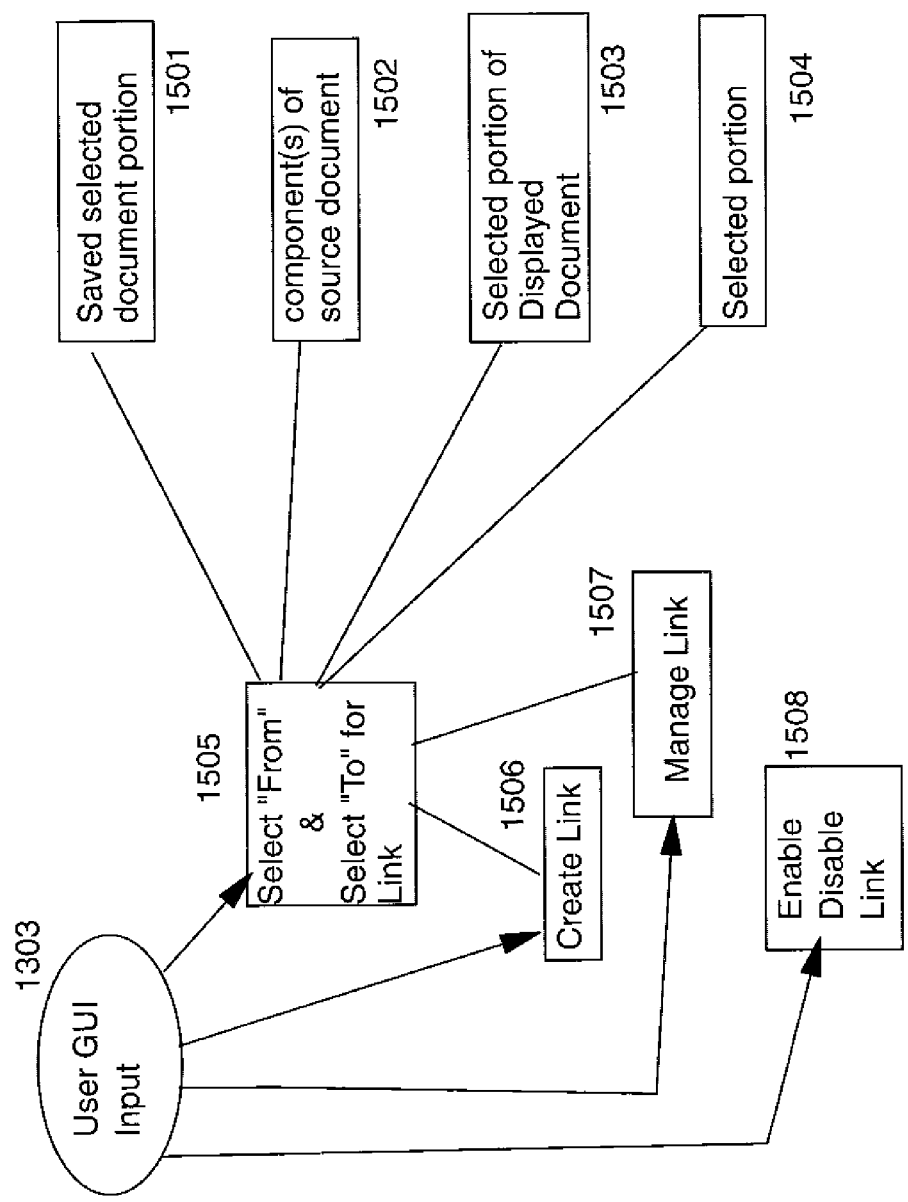

Referring to FIG. 16, a user accesses a GUI interface 1303 in order to either creating 1506 or maintaining 1507 a link between the selected portion and the displayed document, communicating 1505 changes of a first document to a second document, the first document consisting of any one of a saved selected portion 1501, a source document 1502 of a saved selected portion, the selected portion 1503 of the displayed document or the selected portion 1504, the second document consisting of any one of the saved selected portion, the source document of the saved selected portion, the selected portion of the displayed document or the selected portion.

Changes of the first document are mimicked in the second document when the second document is displayed.

Figure 17:
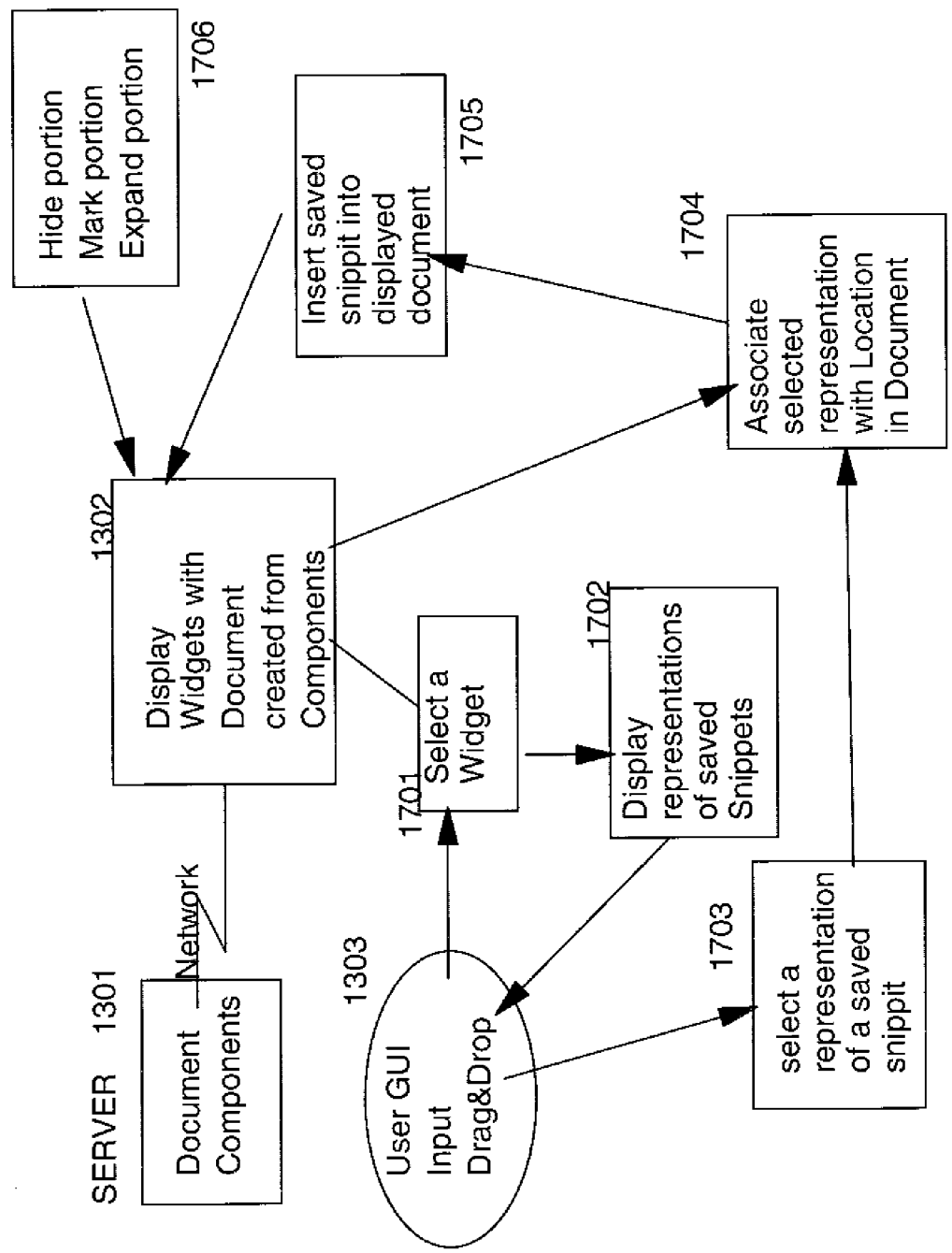

Referring to FIG. 17, a second widget of the one of more widgets is selected 1701 wherein the second widget is any one of the first widget or any other widget of the one or more widgets, responsive to selecting the second widget displaying 1702 one or more representations of saved document portions, associating 1703 a first representation 1703 of the one or more representations of saved document portions with a location in the displayed document, and responsive to the associating step, inserting 1705 the saved document portion of the first representation into the displayed document at the location in the displayed document.

Preferably the displayed document is re-displayed after the performing step, the re-displayed document reflecting changes to the displayed document resulting from the performing step.

In an embodiment, the displayed document is collapsed to hide 1706 the portion dragged from the displayed document, marking 1706 the displayed document to indicate that any one of a change has been made or the location of a change that has been made and expanding 1706 the displayed document to include the inserted document in the displayed document.

In an embodiment the first representation having the saved document portion to be selected is determined 1703 by detecting user GUI cursor placement within the one or more representations of saved document portions, to drag the selected first representation to the location of the displayed document; and to drop the selected first representation at location of the displayed document.

Preferably the one or more widgets are displayed as visual representations of folder tabs.

A link is preferably created 1506 or maintained 1507 between the represented saved document portions and a corresponding one or more associated source components, the source components comprising any one of a shared original file 1502, a shared original file component 1502, a feed or a database, the shared original file including a shared portion that mirrors the represented saved document portions, the shared original file portion comprising a portion of the shared original file and to communicate any one of changes of the represented saved document portions to the associated source component or changes of the associated source component to the represented saved document portions.

Responsive to a user action 1303, the user can enable 1508 the link or disable 1508 the link.

Preferably, in any one of the represented saved document portions, changes are reflected via the link of the associated source component when the represented saved document is displayed or the associated source component reflects changes of the represented saved document portions when the associated source component is displayed.

Preferably, the displayed document is redisplayed after the inserting step, the re-displayed document reflecting changes to the displayed document resulting from the performing step.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A computer program product for editing an electronic document, the computer program product comprising:
    a non-transitory storage medium readable by a processing circuit and storing instructions for execution by the processing circuit for performing a method comprising:
    concurrently displaying all or a section of a first document and one or more widgets at a computer screen, the first document comprising a visual representation derived any one of statically or dynamically from one or more associated source components;
    based on a user's input, selecting a snippet of the first document, extracting snippet link information and snippet position information associated with the snippet from the first document and moving the snippet, snippet link information, and snippet position information from a first displayed item of a pair of displayed items to a second displayed item of the pair of displayed items, wherein the snippet position information indicates a location of the snippet within the first displayed item, wherein the first displayed item is the first document and the second displayed item is a first widget of the one or more widgets, wherein the first widget is associated with a function to be performed on a set of content within the first document selected as the snippet;
    directly, based on the moving, performing the function associated with the first widget on the set of content, wherein the function is one function in a plurality of functions associated with the one or more widgets comprising at least a delete function;
    automatically updating a Document Object Model of the first document based on the function that has been performed, the Document Object Model reflecting the function that has been performed after being updated;
    dynamically re-displaying, directly based on performing the function, the first document with the set of content having the function performed thereon, the first document being dynamically re-displayed based on the Document Object Model that has been updated;
    accessing the snippet link information and snippet position information associated with the snippet;
    analyzing, based on the accessing, the hosting location of the snippet;
    automatically determining that a current set of source components associated with the snippet and corresponding to the snippet position information have changed to a new set of source components at the hosting location, wherein the current set of source components resides at the hosting location; and
    dynamically and automatically updating the snippet at the second displayed item to include the new set of source components.

2. The computer program product according to claim 1, wherein a source component in the current set of source components is at least one of text, an image, an animation, a video, a vector graphic, XML, an RSS feed and HTML.

3. The computer program product according to claim 1, wherein moving the snippet further comprises:
    determining a snippet representation of the snippet to be moved by detecting a user graphical user interface cursor placement within a first location;
    dragging the snippet representation to a second location; and
    dropping the snippet representation at the second location, wherein the dropping comprises saving the snippet represented by the snippet representation.

4. The computer program product according to claim 3, wherein the determining comprises:
    based on cursor placement, painting a selected portion of the first document; and
    based on a user graphical user interface action, selecting the painted selected portion as the snippet.

5. The computer program product according to claim 1, wherein the first document is displayed on a visual representation of a folder and the one or more widgets are visual representations of folder tabs of the folder, wherein the visual representation of folder tabs comprises a visual representation of a function to be performed by a corresponding widget of the one or more widgets.

6. The computer program product according to claim 1, wherein performing the function associated with the first widget comprises at least one of:
    copying the set of content selected as the snippet into a preexisting file;
    hiding the set of content selected as the snippet from the first document;
    deleting the set of content selected as the snippet from the first document;
    marking the first document at the location of the set of content selected as the snippet;
    posting the set of content selected as the snippet to a subscription feed (RSS);
    performing a translation of the set of content selected as the snippet into an image form;
    performing a translation of the set of content selected as the snippet into an animated visual form;

performing a predefined action based on the set of content selected as the snippet;
performing a translation of the set of content selected as the snippet to another language;
performing a translation of the set of content selected as the snippet into an audio form; and
performing a translation of the set of content selected as the snippet into a textual form.

7. The computer program product according to claim 6, further comprising determining the function to be performed based on a user action of selecting the first widget.

8. The computer program product according to claim 3, further comprising:
   manipulating a link between the snippet representation and a corresponding one or more associated source components, the one or more source components comprising at least one of:
   a shared Original file, a shared Original file component, a feed or a database, the shared Original file including a shared portion that mirrors the snippet representation, wherein the manipulating the link comprises at least one of: creating a link; maintaining the link, enabling the link and disabling the link; and
   communicating at least one of
      changes of the snippet representation to the one or more source components, and
      changes of the one or more source components to the snippet representation.

9. The computer program product according to claim 8, wherein the one or more source components reflects changes of the snippet representation when the one or more source components is displayed.

10. The computer program product according to claim 8, further comprising saving a second document, wherein the second document reflects the changes when the second document is displayed.

11. The computer program product according to claim 1, wherein the re-displaying further comprises at least one of:
   collapsing the first document to hide the snippet moved from the first document; and
   expanding the first document to include the snippet in the first document.

12. A method for editing an electronic document, the method comprising:
   concurrently displaying all or a section of a first document and one or more widgets at a computer screen, the first document comprising a visual representation derived at least one of statically or dynamically from one or more associated source components;
   based on a user's input, selecting a snippet of the first document, extracting snippet link information and snippet position information associated with the snippet from the first document and moving the snippet, snippet link information, and snippet position information from a first displayed item of a pair of displayed items to a second displayed item of the pair of displayed items, wherein the snippet position information indicates a location of the snippet within the first displayed item, wherein the first displayed item is the first document and the second displayed item is a first widget of the one or more widgets, wherein the first widget is associated with a function to be performed on a set of content within the first document selected as the snippet;
   directly, based on the moving, performing the function associated with the first widget on the set of content, wherein the function is one function in a plurality of functions associated with the one or more widgets comprising at least a delete function;
   automatically updating a Document Object Model of the first document based on the function that has been performed, the Document Object Model reflecting the function that has been performed after being updated;
   dynamically re-displaying, directly based on performing the function, the first document with the set of content having the function performed thereon, the first document being dynamically re-displayed based on the Document Object Model that has been updated;
   accessing the snippet link information and snippet position information associated with the snippet;
   analyzing, based on the accessing, the hosting location of the snippet;
   automatically determining that a current set of source components associated with the snippet and corresponding to the snippet position information have changed to a new set of source components at the hosting location, wherein the current set of source components resides at the hosting location; and
   dynamically and automatically updating the snippet at the second displayed item to include the new set of source components.

13. The method according to claim 12, wherein a source component of in the current set of source components is at least one of text, an image, an animation, a video, a vector graphic, XML, an RSS feed and HTML.

14. The method according to claim 12, wherein moving the snippet further comprises:
   determining a snippet representation of the snippet to be moved by detecting a user graphical user interface cursor placement within a first location;
   dragging the snippet representation to a second location; and
   dropping the snippet representation at the second location, wherein the dropping comprises saving the snippet represented by the snippet representation.

15. The method according to claim 14, wherein the determining comprises:
   based on cursor placement, painting a selected portion of the first document; and
   based on a user graphical user interface action, selecting the painted selected portion as the snippet.

16. The method according to claim 12, wherein the first document is displayed on a visual representation of a folder and the one or more widgets are visual representations of folder tabs of the folder, wherein the visual representation of folder tabs comprises a visual representation of a function to be performed by a corresponding widget of the one or more widgets.

17. The method according to claim 12, wherein performing the function associated with the first widget comprises at least one of:
   copying the set of content selected as the snippet into a preexisting file;
   hiding the set of content selected as the snippet from the first document;
   deleting the set of content selected as the snippet from the first document;
   marking the first document at the location of the set of content selected as the snippet;
   posting the set of content selected as the snippet to a subscription feed (RSS);
   performing a translation of the set of content selected as the snippet into an image form;

performing a translation of the set of content selected as the snippet into an animated visual form;
performing a predefined action based on the set of content selected as the snippet;
performing a translation of the set of content selected as the snippet to another language;
performing a translation of the set of content selected as the snippet into an audio form; and
performing a translation of the set of content selected as the snippet into a textual form.

18. The method according to claim 17, further comprising determining the function to be performed based on a user action of selecting the first widget.

19. The method according to claim 14, further comprising:
manipulating a link between the snippet representation and a corresponding one or more associated source components, the one or more source components comprising at least one of:
a shared Original file, a shared Original file component, a feed or a database, the shared Original file including a shared portion that mirrors the snippet representation;
wherein the manipulating the link comprises at least one of: creating a link; maintaining the link, enabling the link and disabling the link; and
communicating at least one of
changes of the snippet representation to the one or more source components, and
changes of the one or more source components to the snippet representation.

20. The method according to claim 19, wherein the one or more source components reflects changes of the snippet representation when the one or more source components is displayed.

21. The method according to claim 19, further comprising saving a second document, wherein the second document reflects the changes when the second document is displayed.

22. A system for editing an electronic document, the system comprising:
a server computer connected to a network;
a client computer connected to the network, the client computer comprising storage for holding one or more client data files;
wherein the client computer comprises instructions for performing a method comprising:
concurrently displaying all or a section of a first document and one or more widgets at a computer screen, the first document comprising a visual representation derived at least one of statically or dynamically from one or more associated source components;
based on a user's input, selecting a snippet of the first document, extracting snippet link information and snippet position information associated with the snippet from the first document and moving the snippet, snippet link information, and snippet position information from a first displayed item of a pair of displayed items to a second displayed item of the pair of displayed items, wherein the snippet position information indicates a location of the snippet within the first displayed item, wherein the first displayed item is the first document and the second displayed item is a first widget of the one or more widgets, wherein the first widget is associated with a function to be performed on a set of content within the first document selected as the snippet;
directly, based on the moving, performing the function associated with the first widget on the set of content, wherein the function is one function in a plurality of functions associated with the one or more widgets comprising at least a delete function;
automatically updating a Document Object Model of the first document based on the function that has been performed, the Document Object Model reflecting the function that has been performed after being updated;
dynamically re-displaying, directly based on performing the function, the first document with the set of content having the function performed thereon, the first document being dynamically re-displayed based on the Document Object Model that has been updated;
accessing the snippet link information and snippet position information associated with the snippet;
analyzing, based on the accessing, the hosting location of the snippet;
automatically determining that a current set of source components associated with the snippet and corresponding to the snippet position information have changed to a new set of source components at the hosting location, wherein the current set of source components resides at the hosting location; and
dynamically and automatically updating the snippet at the second displayed item to include the new set of source components.

23. The system according to claim 22, wherein a source component in the current set of source components is at least one of text, an image, an animation, a video, a vector graphic, XML, an RSS feed and HTML.

24. The system according to claim 22, wherein moving the snippet further comprises:
determining a snippet representation of the snippet to be moved by detecting a user graphical user interface cursor placement within a first location;
dragging the snippet representation to a second location; and
dropping the snippet representation at the second location, wherein the dropping comprises saving the snippet represented by the snippet representation.

25. The system according to claim 24, wherein the determining comprises:
based on cursor placement, painting a selected portion of the first document; and
based on a user graphical user interface action, selecting the painted selected portion as the snippet.

26. The system according to claim 22, wherein the first document is displayed on a visual representation of a folder and the one or more widgets are visual representations of folder tabs of the folder, wherein the visual representation of folder tabs comprises a visual representation of a function to be performed by a corresponding widget of the one or more widgets.

27. The system according to claim 22, wherein performing the function associated with the first widget comprises at least one of:
copying the set of content selected as the snippet into a preexisting file;
hiding the set of content selected as the snippet from the first document;
deleting the set of content selected as the snippet from the first document;
marking the first document at the location of the set of content selected as the snippet;
posting the set of content selected as the snippet to a subscription feed (RSS);
performing a translation of the set of content selected as the snippet into an image form;

performing a translation of the set of content selected as the snippet into an animated visual form;

performing a predefined action based on the set of content selected as the snippet;

performing a translation of the set of content selected as the snippet to another language;

performing a translation of the set of content selected as the snippet into an audio form; and performing a translation of the set of content selected as the snippet into a textual form.

28. The system according to claim 27, further comprising determining the function to be performed based on a user action of selecting the first widget.

29. The system according to claim 24, further comprising:

manipulating a link between the snippet representation and a corresponding one or more associated source components, the one or more source components comprising at least one of:

a shared Original file, a shared Original file component, a feed or a database, the shared Original file including a shared portion that mirrors the snippet representation, wherein the manipulating the link comprises at least one of: creating a link; maintaining the link, enabling the link or disabling the link; and communicating at least one of changes of the snippet representation to the one or more source components, and changes of the one or more source components to the snippet representation.

30. The system according to claim 29, herein the one or more source components reflects changes of the snippet representation when the one or more source components is displayed.

31. The system according to claim 29, further comprising saving a second document, wherein the second document reflects the changes when the second document is displayed.

32. The system according to claim 22, wherein the re-displaying further comprises at least one of:

collapsing the first document to hide the snippet moved from the first document; and expanding the first document to include the snippet in the first document.

33. A method for editing an electronic document, the method comprising:

concurrently displaying all or a section of a first document and one or more widgets at a computer screen, the first document comprising a visual representation derived any one of statically or dynamically from one or more associated source components;

based on a user's input, selecting a snippet of the first document, extracting snippet link information and snippet position information associated with the snippet from the first document and moving the snippet, snippet link information, and snippet position information from a first displayed item of a pair of displayed items to a second displayed item of the pair of displayed items, wherein the snippet position information indicates a location of the snippet within the first displayed item, wherein the first displayed item is the first document and the second displayed item is a first widget of the one or more widgets, wherein the first widget is associated with a function to be performed on a set of content within the first document selected as the snippet;

directly, based on the moving, performing the function associated with the first widget on the set of content, wherein the function is a delete function;

automatically updating a Document Object Model of the a first document, the automatically updating removing content in the Document Object Model corresponding to the snippet;

dynamically re-displaying, directly based on performing the function, the first document with the set of content having the function performed thereon, the first document being dynamically re-displayed based on the Document Object Model that has been updated to exclude the snippet;

accessing the snippet link information and snippet position information associated with the snippet;

analyzing, based on the accessing, the hosting location of the snippet;

automatically determining that a current set of source components associated with the snippet and corresponding to the snippet position information have changed to a new set of source components at the hosting location, wherein the current set of source components resides at the hosting location; and dynamically and automatically updating the snippet at the second displayed item to include the new set of source components.

* * * * *